UNITED STATES PATENT OFFICE.

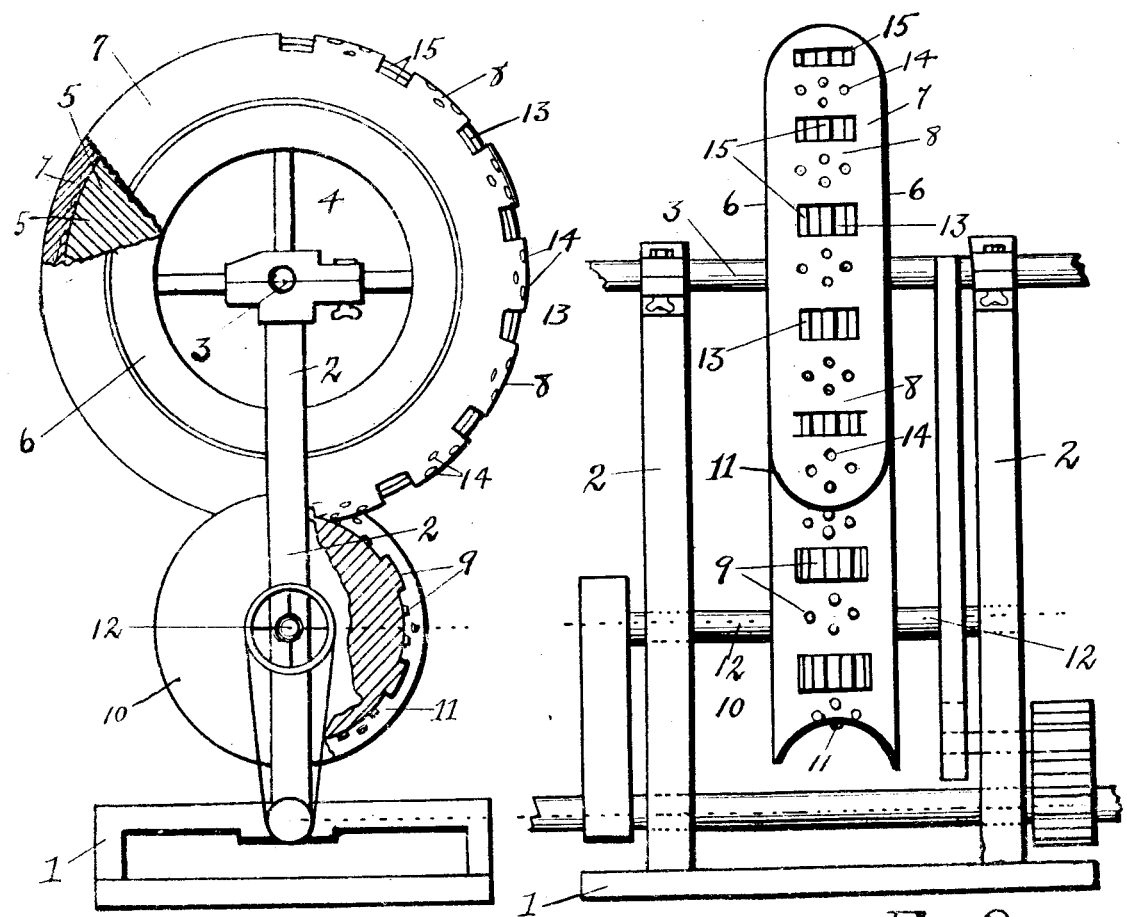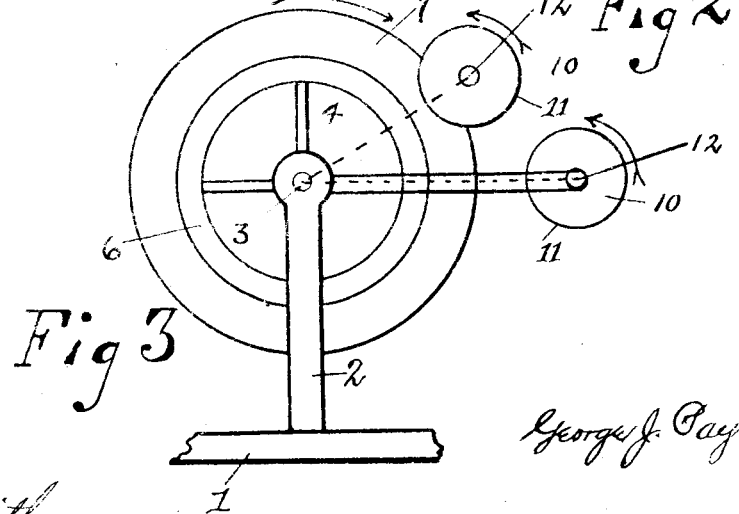

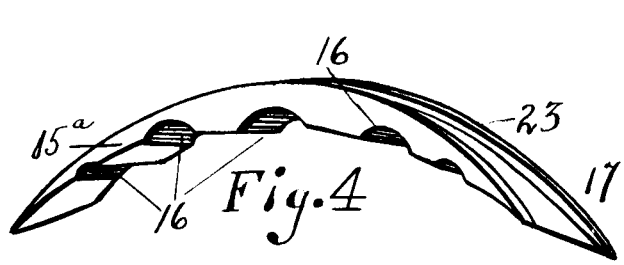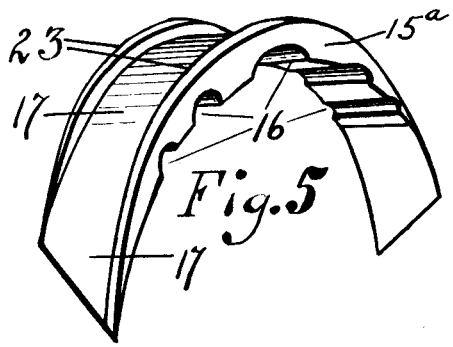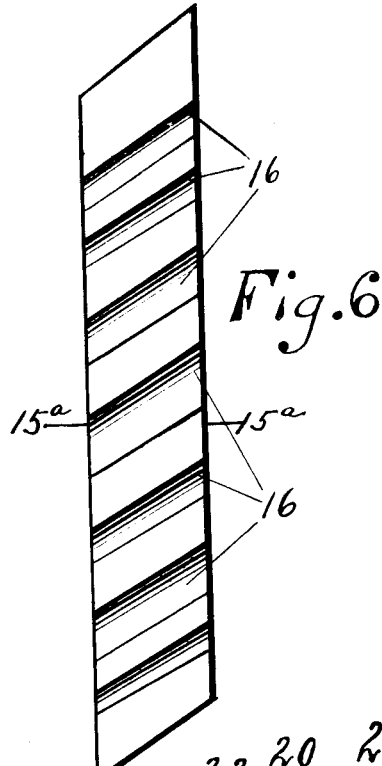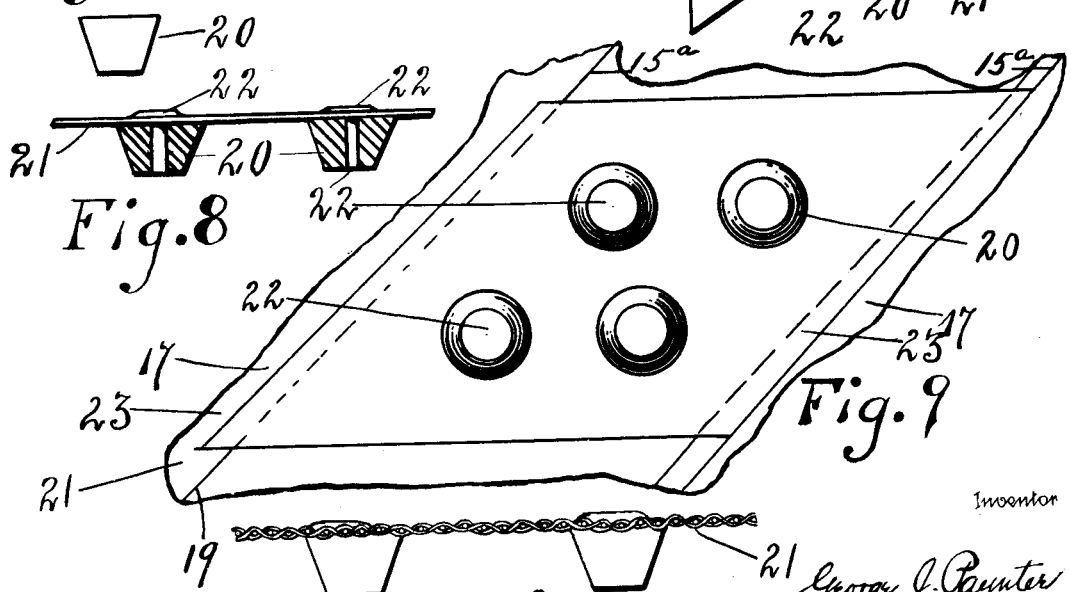

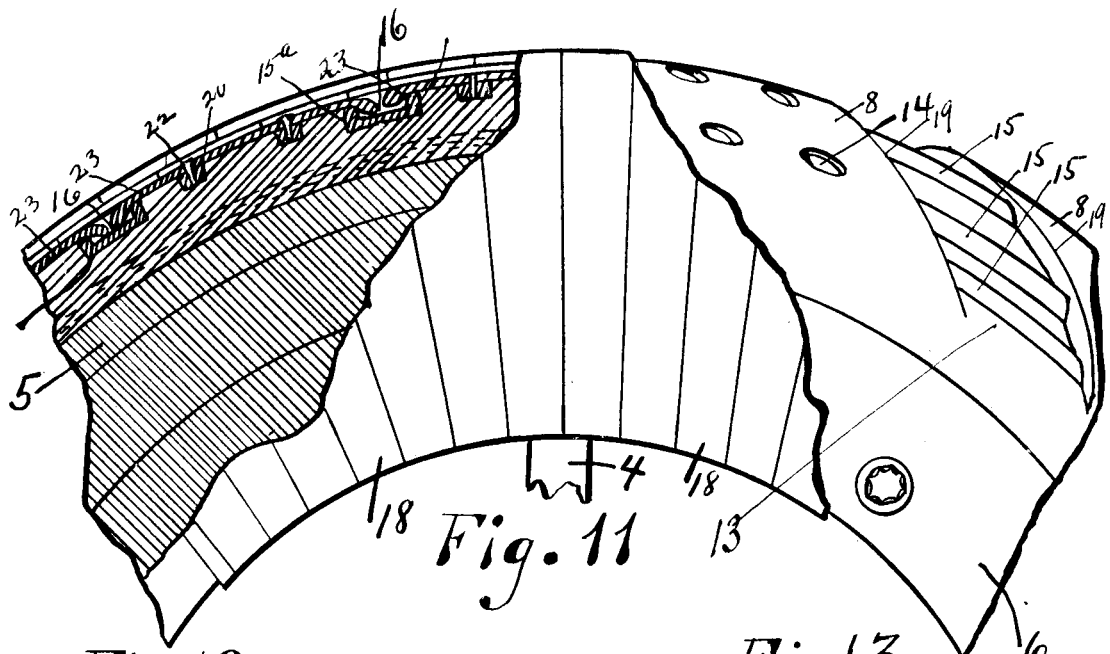

GEORGE J. PAYNTER, OF PHILADELPHIA, PENNSYLVANIA.

METHOD OF MAKING TIRES WITH AN EMBOSSED TREAD.

1,182,308.  Specification of Letters Patent.  Patented May 9, 1916.

Application filed March 30, 1912. Serial No. 687,342.

*To all whom it may concern:*

Be it known that I, GEORGE J. PAYNTER, a citizen of the United States, residing in the city of Philadelphia, county of Philadelphia, State of Pennsylvania, have invented certain new and useful Improvements in the Method of Making Tires with an Embossed Tread, of which the following is a specification.

My invention relates to methods of making tires with an embossed tread and it has particular relation to a method whereby the design of the embossing will be accurately preserved during the vulcanization and which permits the complete escape of the gases generated during said vulcanization to the end that the finished tire will be more perfect in appearance and compact in its texture.

The object of my invention is to cure a tire at one vulcanization without the tread portion losing its shape. Owing to the generation of gases during the process of curing and on account of the softening effect of heat on the ingredients of the rubber compounds which causes them to run and lose their shape, it is necessary to provide means for holding the shape of the design during the curing process.

A further object of my invention is to realize the advantages of the so-called open cure process, while preserving the shape of the design embossed on the tread.

My invention contemplates the preliminary forming of the embossed surface in the green rubber of the tread, the provision of separate forms for maintaining the embossed surface during the vulcanization, and the provision of means for holding said forms in place during said vulcanization which will not interfere with the escape of the gases, to the end that the tire when completed will be homogeneous and free from bubbles.

The nature and characteristic features of my invention will be more readily understood from the following description taken in connection with the accompanying drawings forming part hereof, in which—Figure 1 is a side elevation showing a tire in the first stage of the method having the embossed surface of the tread in the process of being pressed therein by suitable mechanism; Fig. 2 is an end view of the tire and apparatus shown in Fig. 1; Fig. 3 is a diagrammatic view illustrating how various diameters of tires can be embossed with the same embossing roller by changing its radial distance from the center of the tire and its support; Figs. 4 and 5 are perspective views of one of the separate forms used for filling certain of the recesses in the embossed surface of the tire; Fig. 6 is an underneath plan view of the form shown in Figs. 4 and 5; Fig. 7 is a side elevation of a form used to fill suction cups which are embossed in the surface of the tread; Fig. 8 is a transverse section of a patch with a group of suction cup fillers mounted thereon; Fig. 9 is an underneath plan view of said patch; and Fig. 10 is an end view thereof; Fig. 11 is a fragmentary side elevation partly in section of the assembled tire, forms and wrapping; Fig. 12 is a transverse section of an assembled tire protector, forms, and wrapping illustrating the application of the method to the formation of a tire protector; Fig. 13 is a side elevation on a reduced scale of the tire wrapped ready for curing; Figs. 14, 15, 16 and 17 are fragmentary plan views illustrating various types of embossed designs for the formation of which the method is adaptable; and Fig. 18 is a transverse section of the assembled parts shown in Fig. 11.

Referring now more particularly to Figs. 1 and 2 of the drawings, 1 is a frame from which extends upwardly two side columns 2 in which a supporting axle 3 is journaled. Mounted on the axle 3 is a spider frame 4 which supports the core or mandrel 5 upon which the tire 7 is mounted during the carrying out of the process. The side rings 6 embrace the inner outside surface of the tire and thereby maintain the clencher portion of the tire in proper shape and relationship during the curing operation. The embossed tread 8 is formed in the green rubber of the tread portion of the tire by the pressure of the projections 9 which are formed on the outer concaved face 11 of the embossing wheel 10 which is complemental in design to the required design of the embossing of the finished tire. The axle 12 upon which the embossing wheel 10 is mounted is adapted to be rotated preferably in synchronism with the axle 3 by means of gears or other suitable mechanism not shown.

The characteristic features of the embossed design to which my invention is particularly adaptable comprise transverse indentations 13 which may be known as slime grooves, smaller indentations 14 which may be known as suction cups, and ribs 15 located in the bottom of the slime grooves 13.

In Figs. 4 to 6 is illustrated one of the forms for filling the indentations or slime grooves 13, which forms are skewed to fill grooves which are arranged obliquely across the tire. Forms of this type are difficult to make on account of peculiar shape resulting from the embossing of the groove of that shape. The preferred manner of making these forms consists in first embossing the tread in the uncured rubber and then making a plaster of Paris impression thereof from which patterns may be made whereby the forms may be readily cast of the proper shape. The side faces 15ª of the forms thus made taper down to a thin edge and on the inner surface of the same there are preferably provided grooves 16 that correspond in shape to the ribs 15 in the tread of the tire. In order that the forms may have sufficient flexibility to readily adapt themselves during the wrapping of the tire with the spiral wrapping 18 hereinafter described, they are preferably grooved on their outer faces as at 17. The forms as above described are preferably made of aluminium which seems to have just enough flexibility, when the forms are made as described, to meet the requirements of the compression during the wrapping and subsequent vulcanization of the tire. Rubber forms may be used to fill these grooves, but it has been found that rubber forms will cure up hard in a short time after several successive uses and become brittle and useless; aluminium, however, does not require the use of soapstone on the tread as aluminium does not stick to the rubber after vulcanization.

In order to maintain the shape of the suction cups 14, hereinbefore referred to, during the vulcanization, the truncated cone shaped forms 20 are employed for temporarily filling the same. These forms 20 are preferably arranged in groups secured on patches of canvas 21 or other suitable porous material to which they are fastened by means of rivets 22. The pieces of canvas 21 are preferably made of such size and shape as to lap over the side walls 23 of the forms shown in Figs. 4 to 6 to thereby prevent the ends of the canvas from getting cured into the tread and also insuring a clean sharp corner 19 at the top of the slime grooves. The canvas upon which the suction cup fillers are mounted is preferably made in small pieces as above described, as otherwise the proper maintaining of the suction cup fillers in their respective places would be interfered with.

The uncured tire being mounted on the mandrel 5 and the filler forms being conveniently provided as above set forth, the design of the tread is first embossed by means of the roller 10 whereupon the assembled mandrel, side rings 6 and the filler forms are incased by the spiral wrapping 18 of canvas or other suitable porous material, the filler forms being successively placed in position as the wrapping progresses. After the wrapping is completed as shown in Fig. 13, the assembled structure is then subjected to the usual heat treatment to vulcanize the tire to the desired consistency. It will be seen that the tread portion of the tire will be subjected at all points to uniform pressure and that the gases generated during the vulcanizing will be permitted to escape through the interstices of the canvas of the wrapping and the canvas patches upon which the suction cup fillers are mounted, and the resulting tire will be found to be neat in appearance and homogeneous and compact in its texture. It will, of course, be understood that the tire may be provided with the usual embedded canvas reinforcing strips and in other respects may be substantially similar to the well known types of tires at present in common use. It is also to be understood that the drawings are to be considered as merely diagrammatic and that the apparatus for carrying out the invention may assume a variety of forms other than those shown.

Having thus described the nature and characteristic features of my invention what I claim as new and desire to secure by Letters Patent is:—

1. The method of making tires which consists in forming the tire with a green tread on a rigid core or mandrel of a size and shape conforming to the finished internal dimensions of the tire, then embossing a design in the tread, then filling the indentations in said design with separate filler forms and wrapping the structure thus assembled with a porous envelop, and thereafter vulcanizing the same, the tire being supported on said rigid core or mandrel during the entire operation.

2. The method of making tires which consists in forming the tire with a green tread on a rigid core or mandrel of a size and shape conforming to the finished internal dimensions of the tire, then embossing a design in the tread including transverse grooves and suction cups, then filling said grooves and suction cups with separate filler forms and wrapping the structure thus assembled with a porous envelop, and thereafter vulcanizing the same, the tire being supported on said rigid core or mandrel during the entire operation.

3. The method of making tires which consists in forming the tire with a green tread on a rigid core or mandrel of a size and shape conforming to the finished internal dimensions of the tire, then embossing a design including suction cups in the tread, then filling said suction cups with complemental filler forms mounted in groups on a porous support and wrapping the structure thus assembled with a porous envelop, and thereafter vulcanizing the same, the tire being supported on said rigid core or mandrel during the entire operation.

4. The method of making tires which consists in forming the tire with a green tread on a rigid core or mandrel, embossing a design including transverse grooves and suction cups in the tread, filling said grooves with separate filler forms, filling said suction cups with filler forms mounted on porous supports which overlap the forms arranged in the grooves, wrapping the structure thus assembled with a porous envelop, and then vulcanizing the same, the tire being supported on said rigid core or mandrel during the entire operation.

In testimony whereof I affix my signature in presence of two witnesses.

GEORGE J. PAYNTER.

Witnesses:
MARY McCALLA,
THEO. H. McCALLA.